Jan. 23, 1951
R. A. HILL
2,539,019
SAND SEPARATOR
Filed March 27, 1947
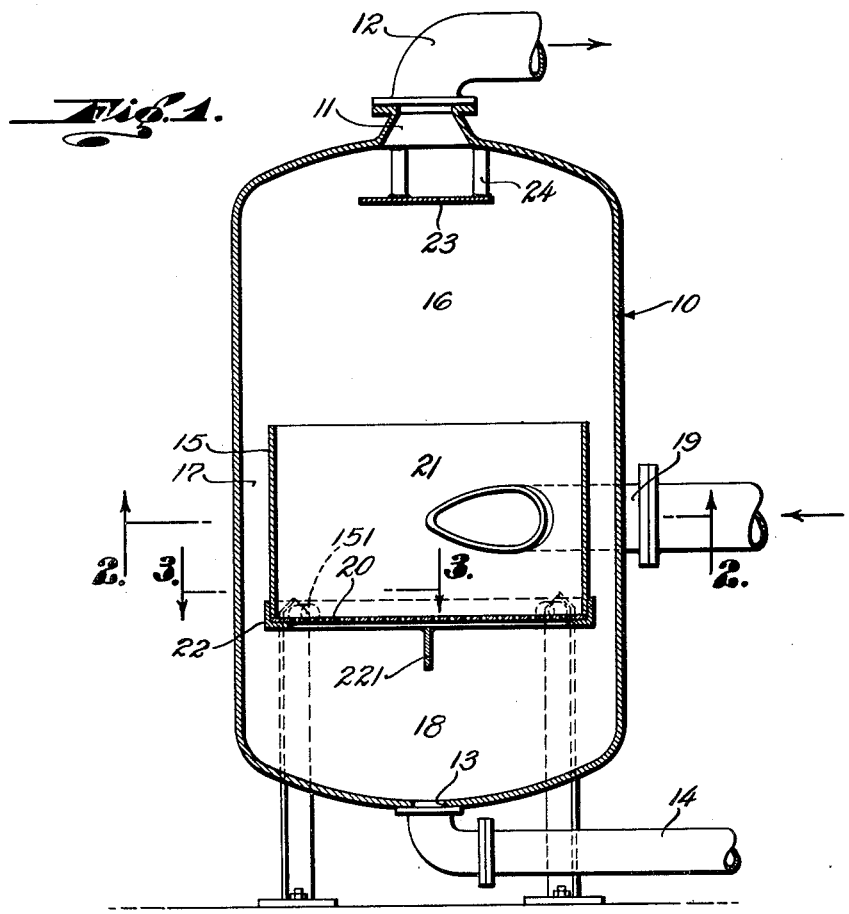
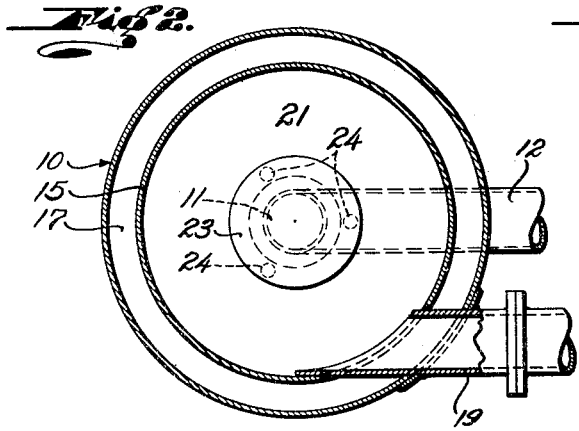
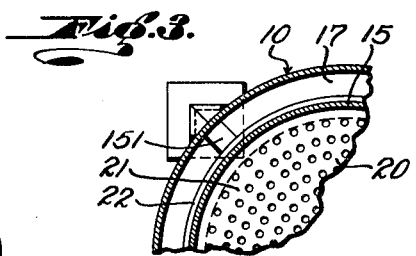
RAYMOND A. HILL
INVENTOR.
BY  *signature*
ATTORNEY Patented Jan. 23, 1951

2,539,019

UNITED STATES PATENT OFFICE 2,539,019

SAND SEPARATOR

Raymond A. Hill, San Marino, Calif.

Application March 27, 1947, Serial No. 737,681

3 Claims. (Cl. 210—61)

This invention has to do generally with separators for removing entrained solids from liquids, and is concerned particularly with improvements in centrifugal type separators for extracting sand from water.

Under stable flow conditions, the removal of sand from water has been accomplished with fair success by centrifugal separation, i. e. by directing the sand laden water into a cylindrical vessel within which the water assumes a swirling flow causing the sand particles to deposit against the wall of the vessel and gravitate to a bottom outlet. Reliance has been placed largely upon the maintenance within a single shell of a flow velocity and course that will tend to segregate the sand without reentraining it in the water rising to an outlet in the top of the vessel. So long as a uniform velocity equal to or less than that magnitude is maintained, satisfactory sand separation may be effected, but should the water develop a pulsating or surging flow, its consequent velocity increases tend to create turbulences which may reentrain a substantial portion of initially segregated sand.

A primary object of the invention is to provide improvements in an inertia or centrifugal type separator which, in contemplation of surging flow conditions, will assure recovery in the separator of the entire sand content of the water. The invention is predicated upon the association with a centrifugal separating zone, of a space for the reception of sand from that zone but within which the water flow is kept below the sand entrainment velocity so that the solids will separate by gravity. Further contemplated is the provision of a settling passage for reception of sand particles carried beyond the centrifugal separating zone, and within which the water has negligible velocity.

Structurally the invention departs from the conventional separators by placing within and in spaced relation to the separator vessel proper, an inside circular cross-section shell into which the sand laden water is directed for centrifugal separation of the sand within the shell. Flowing upwardly and out of the shell, the water enters an enlarged flow path defined by a space in the upper interior of the vessel and within which the flow rate of the water reduces below its sand entraining velocity, permitting the sand to gravitate into a quiescent settling passage between the vessel and shell, and through which the sand passes into a bottom collecting space which also receives the sand separated in and settling from the shell.

All the various features and objects of the invention, as well as the details of a typical and preferred embodiment, will be understood to better advantage from the following description of the accompanying drawing, in which:

Fig. 1 is a view showing the separator in vertical section;

Fig. 2 is a cross-section on line 2—2 of Fig. 1; and

Fig. 3 is a fragmentary plan section taken on line 3—3 of Fig. 1.

The separator comprises a cylindrical vessel 10 which may consist of a simple shell having a top outlet 11 connecting with the water discharge line 12, and a bottom outlet 13 through which separated sand is discharged to the drawoff line 14. Vessel 10 contains an inside circular cross-section shell 15 suitably supported therein and in annularly spaced relation, as by means of bracket members 151. The shell 15 opens upwardly into an enlarged space 16 within and having the cross-sectional area of the outer vessel, this space being in communication through the annular passage 17 with the sand collecting space 18 in the base of the vessel below the inner shell.

The sand laden water is delivered through pipe 19 tangentially into the shell 15 so that the water assumes therein a high velocity swirling course of flow causing the entrained sand particles to be centrifugally segregated against the shell surface, from which they settle by gravity into the collecting space 18. Preferably the shell is provided with a foraminate bottom, such as a screen or perforated plate 20, the openings in which are sufficiently large to readily pass the separated sand. Essentially the screen function is that of a sand passing medium or baffle which isolates space 18 from the high velocity swirl of water in the shell space 21, thus preventing in the bottom space a communicated turbulence which might otherwise tend to agitate the settling sand into the top space 16. As will be understood, the screen 20 may be applied to the shell in any suitable manner, as by confinement within the flange retaining ring 22. The latter may carry a depending baffle 221, which arrests swirling of the water in space 18.

From the foregoing it will appear that the sand undergoes initial centrifugal separation in space 21, and that the water assumes swirling flow upwardly into space 16. As a consequence of the larger vessel diameter, the flow velocity of the water rising to the outlet 11 is dropped below its sand entrained velocity, with the result that any remaining sand particles gravitate toward the bottom of the vessel. The swirling course of the water leaving space 21 displaces such particles toward the outside of space 16 so that the sand falls directly into the annular passage 17 wherein the particle gravitation into the bottom of space 18 is unimpeded by reason of the quiescent condition of the water below the shell rim. It may be further observed that any sand particles being thrown or spilled outwardly over the top rim of shell 15, readily become isolated by reason of their tendency to immediately settle into the surrounding passage 17. As a means of preventing direct channeling flow into the outlet and consequent sand carry-over, the outlet may be baffled, as by a transverse plate 23 suspended from the top of the shell on supports 24. The function of the baffle is particularly to prevent the formation of a vortex in the rising water which, in the absence of the baffle might tend to carry sand particles directly to the outlet. The presence of the baffle so enlarges the swirling course of the water flow as to avoid a vortex induction to the outlet, and effectively maintains the flow below a sand entraining velocity.

I claim:

1. A hydraulic sand separator comprising a closed cylindrical casing containing an upper space and a lower space, a cylindrical shell within said casing intermediate said spaces and in open communication with the upper space, said shell having a bottom disposed over said lower space, said shell being spaced from the casing to form a sand settling passage between said upper and lower spaces, a water outlet at the top of said upper space, means for feeding sand-carrying water tangentially into said shell to cause it to swirl therein and upwardly toward said outlet, and a baffle disposed beneath said outlet and acting to prevent vortex flow of water and sand particles into the outlet.

2. A hydraulic sand separator comprising a closed cylindrical casing containing an upper space and a lower space, a cylindrical shell within said casing intermediate said spaces and in open communication with the upper space, said shell having a bottom disposed over said lower space and perforated at spaced locations over substantially its entire extent to permit the passage of sand from the shell into the lower space, said shell being spaced from the casing to form a sand settling passage between said upper and lower spaces, means for feeding sand-containing water tangentially into said shell to swirl upwardly into said upper space for removal of sand through said shell bottom and through said passage into the lower space, outlet means for removing the sand, and outlet means for separately removing the water.

3. A hydraulic sand separator comprising a closed cylindrical casing containing an upper space and a lower space, a cylindrical shell within said casing intermediate said spaces and in open communication with the upper space, said shell having a flat bottom disposed over said lower space and perforated at spaced locations over substantially its entire extent to permit the passage of sand from the shell into the lower space, said shell being spaced from the casing to form a sand settling passage between said upper and lower spaces, means for feeding sand-containing water tangentially into said shell to swirl upwardly into said upper space for removal of sand through said shell bottom and through said passage into the lower space, outlet means for removing the sand, and outlet means for separately removing the water.

RAYMOND A. HILL.

REFERENCES CITED

The following references are of record in the file of this patent:

UNITED STATES PATENTS

| Number | Name | Date |
|---|---|---|
| 1,333,197 | Arzinger | Mar. 9, 1920 |
| 2,025,059 | Kermer | Dec. 24, 1935 |
| 2,229,860 | McCurdy | Jan. 28, 1941 |
| 2,301,371 | Corwin | Nov. 10, 1942 |
| 2,308,670 | Bolton | Jan. 19, 1943 |
| 2,381,760 | Latham | Aug. 7, 1945 |
| 2,425,110 | McCurdy | Aug. 5, 1947 |
| 2,450,070 | Wright | Sept. 28, 1948 |

FOREIGN PATENTS

| Number | Country | Date |
|---|---|---|
| 402,517 | France | Aug. 31, 1909 |
| 566,654 | Germany | Dec. 19, 1932 |